United States Patent [19]

Ferolito et al.

[11] Patent Number: 5,274,678
[45] Date of Patent: Dec. 28, 1993

[54] CLOCK SWITCHING APPARATUS AND METHOD FOR COMPUTER SYSTEMS

[75] Inventors: Philip A. Ferolito, Sunnyvale; Sundari S. Mitra, Milpitas, both of Calif.

[73] Assignee: Intel Corporation, Santa Clara, Calif.

[21] Appl. No.: 815,819

[22] Filed: Dec. 30, 1991

[51] Int. Cl.⁵ ............................................. H04L 7/00
[52] U.S. Cl. ............................... 375/108; 307/269
[58] Field of Search ............... 375/106, 107, 110, 113, 375/108; 307/269

[56] References Cited

U.S. PATENT DOCUMENTS

| | | | |
|---|---|---|---|
| 4,796,278 | 1/1989 | Naka | 375/108 |
| 4,855,615 | 8/1989 | Humpleman | 307/269 |
| 4,899,351 | 2/1990 | Bonke | 375/108 |
| 5,099,140 | 3/1992 | Mudgett | 307/269 |
| 5,099,141 | 3/1992 | Utsunomiya | 307/269 |
| 5,155,380 | 10/1992 | Hwang et al. | 307/269 |

*Primary Examiner*—Curtis Kuntz
*Assistant Examiner*—Hai H. Phan
*Attorney, Agent, or Firm*—Blakely, Sokoloff, Taylor & Zafman

[57] ABSTRACT

A clock switching apparatus is provided in a data processing system which includes a system clock for selectively switching the system clock from a first clock signal to a second clock signal and vice versa. The clock switching apparatus includes a multiplexer coupled to receive the first clock signal and the second clock signal for selectively switching the system clock from the first clock signal to the second clock signal. The multiplexer provides the system clock. A control logic circuit is coupled to receive the second clock signal and a control signal for controlling the multiplexer to switch the system clock from the first clock signal to the second clock signal, wherein the control signal is synchronized to the second clock signal in the control logic circuit to become a synchronized control signal. The multiplexer switches the system clock from the first clock signal to the second clock signal when receiving the synchronized control signal from the control logic circuit. A pass logic circuit is provided for outputting the system clock. The pass logic circuit receives the system clock from the multiplexer. The pass logic circuit is controlled by the control logic circuit to output the system clock such that a glitch-free and minimum transitional period within which the system clock is switched from the first clock signal to the second clock signal is ensured. A method of selectively switching the system clock from the first clock signal to the second clock signal in the data processing system is also described.

11 Claims, 9 Drawing Sheets

CLOCK SWITCHING APPARATUS AND METHOD FOR COMPUTER SYSTEMS

FIELD OF THE INVENTION

The present invention pertains to the field of clock circuits for computer systems. More particularly, this invention relates to a scheme of dynamically switching the current system clock between a plurality of asynchronous sub-system clocks in a computer system.

BACKGROUND OF THE INVENTION

Typically, in a prior art microprocessor based computer system having a plurality of components such as a microprocessor, a memory, and peripheral devices, it is necessary to exchange information among these components. For instance, the microprocessor may access the memory for reading data from or writing data to the memory. In addition, the memory may be accessed by a peripheral device such as a disk drive for data transfer. The information exchange in such a computer system is typically accomplished via a bus that is coupled to all the components in the computer system.

However, in such a prior computer system, each component is typically operating under an independent clock. In this case, each of the components in the computer system is generally unaware of the timing behavior of the others. Therefore, data transfer between the components in the computer system requires an interface that can synchronize the data transferred from the sender's clock to the receiver's clock. The interface must also be able to synchronize any return signal from the receiver with the sender's clock signal.

Typically, in one prior art interface between two components, a synchronizer is required to perform a handshake operation. FIG. 1 illustrates the use of the synchronizer for the handshake operation for the data transfer. In FIG. 1, a sender 1 is shown to represent the component in the computer system that is transferring data out. A receiver 2 represents the component that receives the data being transferred from sender 1. A synchronizer 3 is coupled between sender 1 and receiver 2. The data being transferred is first sent from sender 1 to synchronizer 3 at the sender's clock. The data is then synchronized to the receiver's clock at synchronizer 3 and fetched by receiver 2 at the receiver's clock. Synchronizer 3 receivers the receiver's clock via line 5.

Another synchronizer 4 is also coupled between sender 1 and receiver 2 to form a return path between sender 1 and receiver 2. When the data transfer is completed, receiver 2 sends an acknowledge signal at receiver's clock to synchronizer 4. The acknowledge signal is then synchronized at synchronizer 4 to sender's clock and is fetched by sender 1. Synchronizer 4 receives the sender's clock via line 6.

One disadvantage associated with such arrangement is that the data being transferred to the receiver has to be delayed in the synchronizer in order for the data to be synchronized with the receiver's clock signal. When the data is latched into the synchronizer, the data is held in the synchronizer for at least one clock phase period at the receiver's clock rate in order to assure that the data is received and synchronized. In this case, synchronization penalty is paid that causes much time to be wasted in the data transfer.

Another disadvantage associated with the arrangement is that any data transfer within the computer system has to be accompanied by the handshake operation. This requires additional logic, such as the synchronizer, to accomplish the operation. In this case, the logic of the interface becomes more complicated and more costly.

SUMMARY AND OBJECTS OF THE INVENTION

One of the objects of the present invention is to provide a method and apparatus for facilitating rapid data transfer between various system devices operating at different clock frequencies in a computer system.

Another object of the present invention is to provide a method and apparatus for dynamically switching the current system clock between a plurality of sub-system clocks in a computer system which eliminates the need to synchronize data transactions across different time domains.

Another object of the present invention is to provide a method and apparatus for dynamically switching the current system clock between a plurality of asynchronous sub-system clocks in a computer system that ensures a glitch-free data transaction.

A clock switching apparatus is provided in a data processing system which includes a system clock for selectively switching the system clock from a first clock signal to a second clock signal and vice versa. The clock switching apparatus, in one embodiment, includes a multiplexer coupled to receive the first clock signal and the second clock signal for selectively switching the system clock from the first clock signal to the second clock signal. The multiplexer provides the system clock. A control logic circuit is coupled to receive the second clock signal and a control signal for controlling the multiplexer to switch the system clock from the first clock signal to the second clock signal, wherein the control signal is synchronized to the second clock signal in the control logic means to become a synchronized control signal. The multiplexer switches the system clock from the first clock signal to the second clock signal when receiving the synchronized control signal from the control logic means. A pass logic circuit is provided for outputting the system clock. The pass logic circuit receives the system clock from the multiplexer. The pass logic circuit is controlled by the control logic circuit to output the system clock such that a glitch-free and minimum transitional period within which the system clock is switched from the first clock signal to the second clock signal is ensured.

A method of selectively switching a system clock from a first clock signal to a second clock signal in a data processing system having the system clock and a plurality of clock signals is also described. The plurality of clock signals include the first clock signal and the second clock signal. The method comprises the steps of:

(A) applying a switching signal to a synchronizing means;

(B) synchronizing the switching signal in a synchronizing means to the second clock signal to become a synchronized switching signal, wherein the synchronizing means is clocked by the second clock signal;

(C) applying the synchronized switching signal to a multiplexing means to switch the system clock from the first clock signal to the second clock signal, wherein the multiplexing means is coupled to receive the plurality of clock signals, and wherein the multiplexing means provides the system clock;

(D) applying the system clock to a pass logic means from the multiplexing means, wherein the pass logic means outputs the system clock to the data processing system;

(E) applying the switching signal to a first edge detecting means for detecting a signal edge in the switching signal, wherein the signal edge represents a request for switching the system clock;

(F) applying the synchronized switching signal to a second edge detecting means for detecting the signal edge in the synchronized switching signal; and (G) controlling the pass logic means to output a high state signal during a transitional period, wherein the transitional period starts when the first edge detecting means detects the signal edge in the switching signal and ends after the second edge detecting means detects the signal edge of the synchronized switching signal, wherein the multiplexing means switches the system clock from the first clock signal to the second clock signal within the transitional period, wherein the transitional period is glitch-free and minimum.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 2:
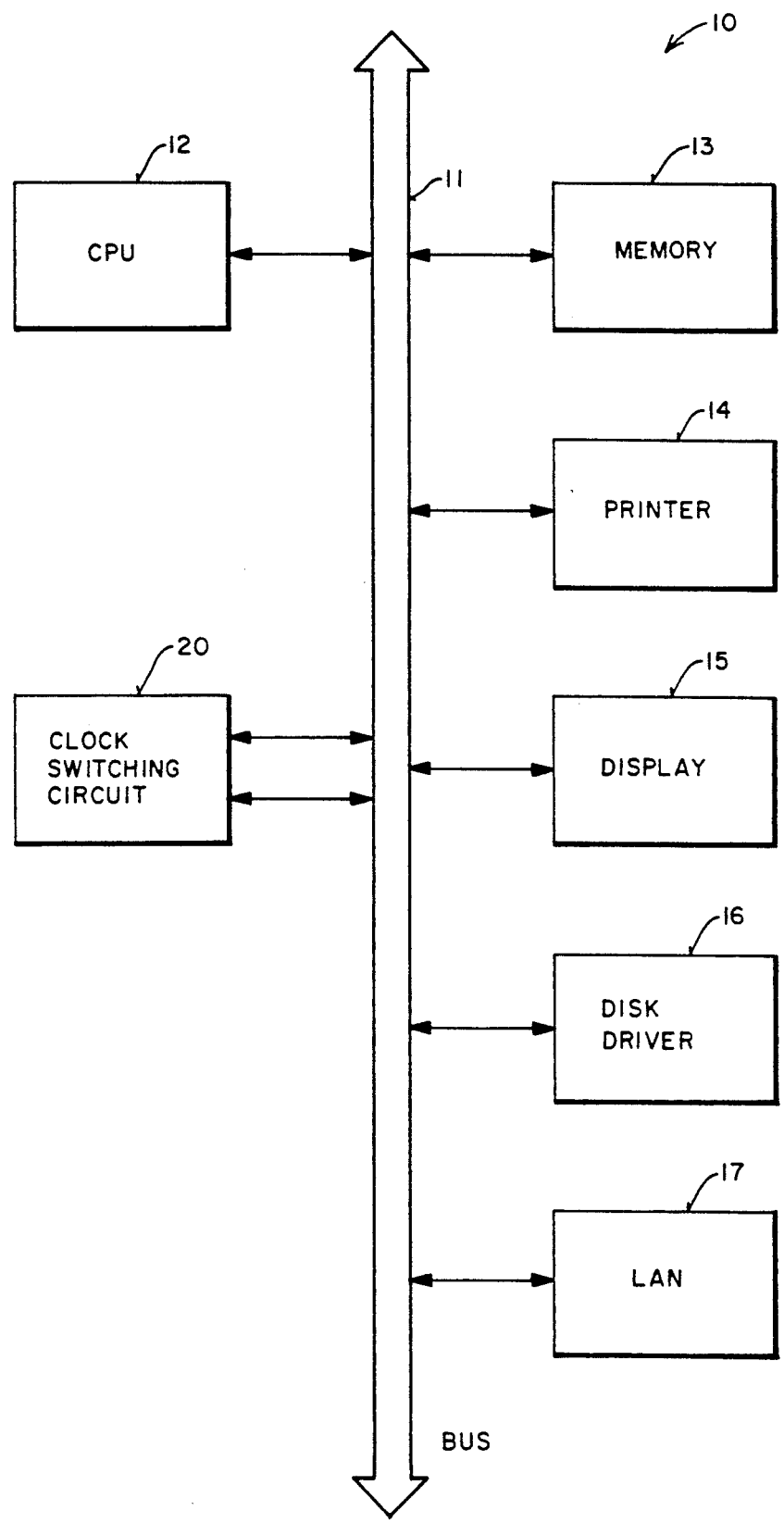
FIG. 2 is a block diagram of a computer system, including a clock switching circuit.

FIG. 2 schematically illustrates in block diagram form the architecture of a microprocessor based computer system 10, which implements a preferred embodiment of the present invention.

In FIG. 2, computer system 10 includes a central processing unit (CPU) 12. CPU 12 typically contains a microprocessor (not shown) and a cache (not shown) connected to the microprocessor. In one embodiment, CPU 12 includes a microprocessor, a co-processor, a cache random access memory (RAM), and a cache controller for handling access to the cache RAM by the microprocessor. In alternative embodiments, more or fewer elements may be included in CPU 12. For instance, CPU 12 may only include the microprocessor.

In the currently preferred embodiment, CPU 12 comprises an 80386 microprocessor (i.e., i386 TM CPU) manufactured by Intel Corporation of Santa Clara, Calif. In another embodiment, CPU 12 may comprise an 80486 microprocessor (i.e., i486 TM CPU) also manufactured by Intel Corporation.

CPU 12 is coupled to a system bus 11 of computer system 10. System bus 11 is employed in computer system 10 as the backplane bus for transfer of data among various components of computer system 10. System bus 11 is coupled to a memory 13, a printer 14, a display 17, a disk driver 16, and a local area network (LAN) interface 17. Each of components 13-17 typically includes a controller (not shown) that controls the device operation of the device and data transfer with other components via system bus 11. In other words, computer system 10 is comprised of a common bus 11 and a plurality of components 12-17 coupled to bus 11. Bus 11 includes a bus controller (not shown) that controls bus operation of bus 11. The bus controller of bus 11 includes a bus clock signal.

Memory 13 may comprise a RAM and a ROM. Memory 13, however, may include other type of memories. Memory 13 is accessed by components 12-17 of computer system 10 via system bus 11.

Components 12-17 may each include an independent clock signal. In one embodiment, when two of components 12-17 intend to exchange data via bus 11, the clock signal of the receiving component is employed in both the sending component and the receiving component for the synchronous data transfer. In this case, no handshake operation is required for the data transfer and no synchronizer or any other similar device is needed to perform the handshake operation. For example, when CPU 12 desires to transfer data to disk driver 16, both CPU 12 and disk driver 16 operate under the clock signal of disk driver 16. When disk driver 16 is sending data to CPU 12, the clock signal of CPU 12 is employed in both CPU 12 and disk driver 16.

In the currently preferred embodiment, memory 13 does not have an independent clock signal and is operating under the clock signal of CPU 12. In a further preferred embodiment, when any of components 14-17 is engaging in data transfer via bus 11, the bus clock signal is employed in computer system 10. For example, when disk driver 16 is accessing memory 13 for the data transfer, the bus clock signal is employed in components 12, 13, and 16 (Memory 13 assumes the clock signal of CPU 12).

In another preferred embodiment, when any of components 12-17 initiates a bus cycle to transfer the data to another component via bus 11, the bus clock signal is dynamically switched to the clock signal of the component initiating the bus cycle on bus 11. In this case, data transaction from the component initiating the bus cycle for data transfer to bus 11 is synchronized to the clock signal of the initiating component.

This clock switching scheme for the data transfer in computer system 10 eliminates the need to synchronize the data being transferred and as a result, increases the speed of the data transfer.

The clock switching operation of computer system 10 is accomplished by a clock switching circuit 20 in computer system 10. As can be seen from FIG. 2, computer system 10 includes clock switching circuit 20, which is coupled to bus 11. Clock switching circuit 20 is provided with the independent clock signals of computer system 10 via bus 11. In one embodiment, clock switching circuit 20 may be provided with all the independent clock signals of computer system 10. In alternative embodiments, clock switching circuit 20 may be provided with fewer than all the independent clock signals. For example, clock switching circuit 20 can be provided with only two independent clock signals. Clock switching circuit 20 also receives a switch control signal via bus 11. Typically, clock switching circuit 20 receives the switch control signal from CPU 12. The switch control signal controls the switching of clock switching circuit 20 and the selection of one of the independent clock signals to two components that are exchanging data with each other. Clock switching circuit 20 receives the switch control signal when any two components desire to exchange data. In one embodiment, the sending component generates the switching control signal to clock switching circuit 20 before transferring the data. In another embodiment, the receiving component generates the switching control signal to clock switching circuit 20 before the data transaction starts.

Clock switching circuit 20, when receiving the switch control signal, starts to switch its output clock signal (i.e., the system clock signal) to the clock signal of one of the sending and receiving components and apply the new system clock to both the sending component and the receiving component for data transfer operation. In the presently preferred embodiment, when two of components 12-17 are exchanging data, the two components operate under the clock signal of the receiving component. In an alternative embodiment, when two of components 12-17 are exchanging data, the two components operate under the clock signal of the sending component. In another alternative embodiment, when two of components 12-17 are transferring data from one another, the bus clock signal is employed in both components. In this way, data transfer between any two components is synchronized to one clock signal, thus obtaining rapid data transfer between the two components that are operated under different clock signals. The circuitry of clock switching circuit 20 and its operation of switching the clock signals are described in more detail below, in conjunction with FIGS. 3-9.

Figure 1:
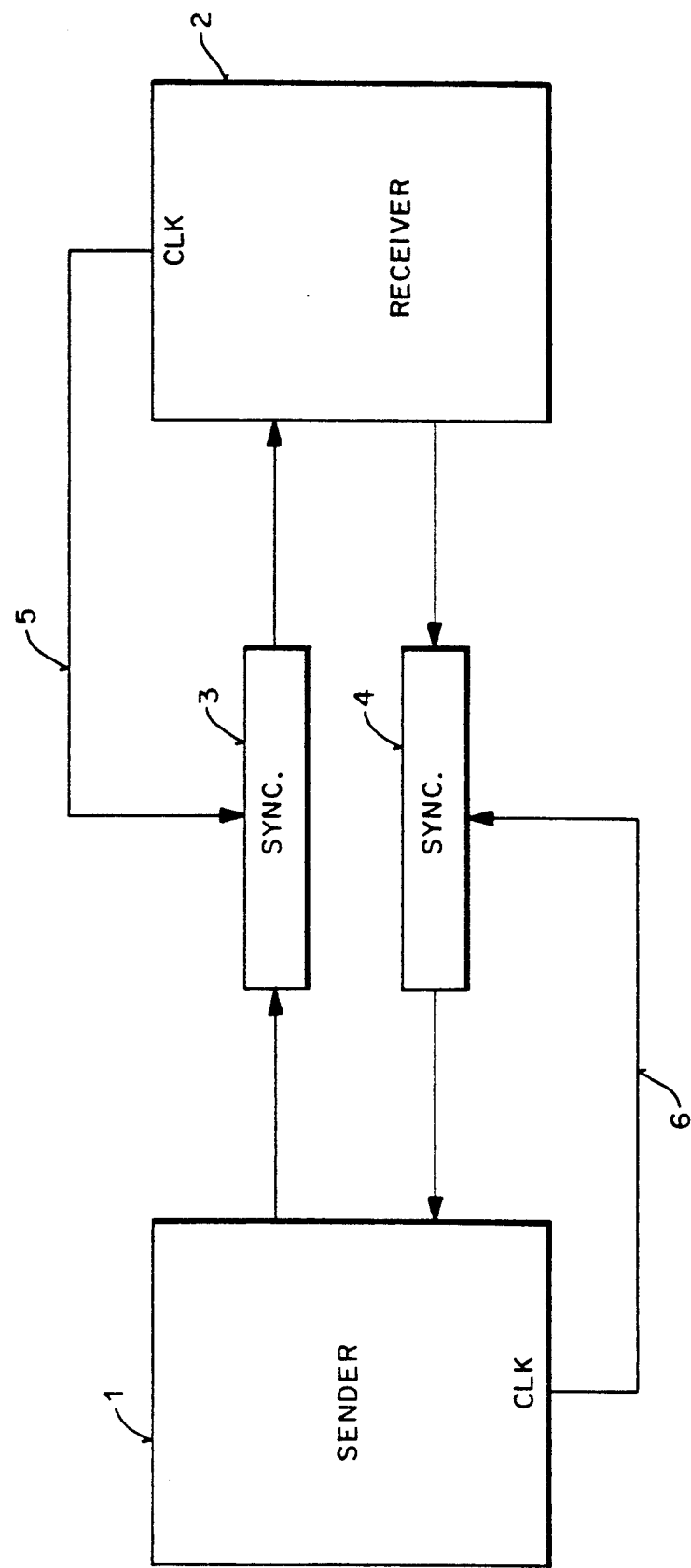
FIG. 1 is a schematic diagram showing one prior art arrangement for data transfer between two components of a computer system.
Figure 3:
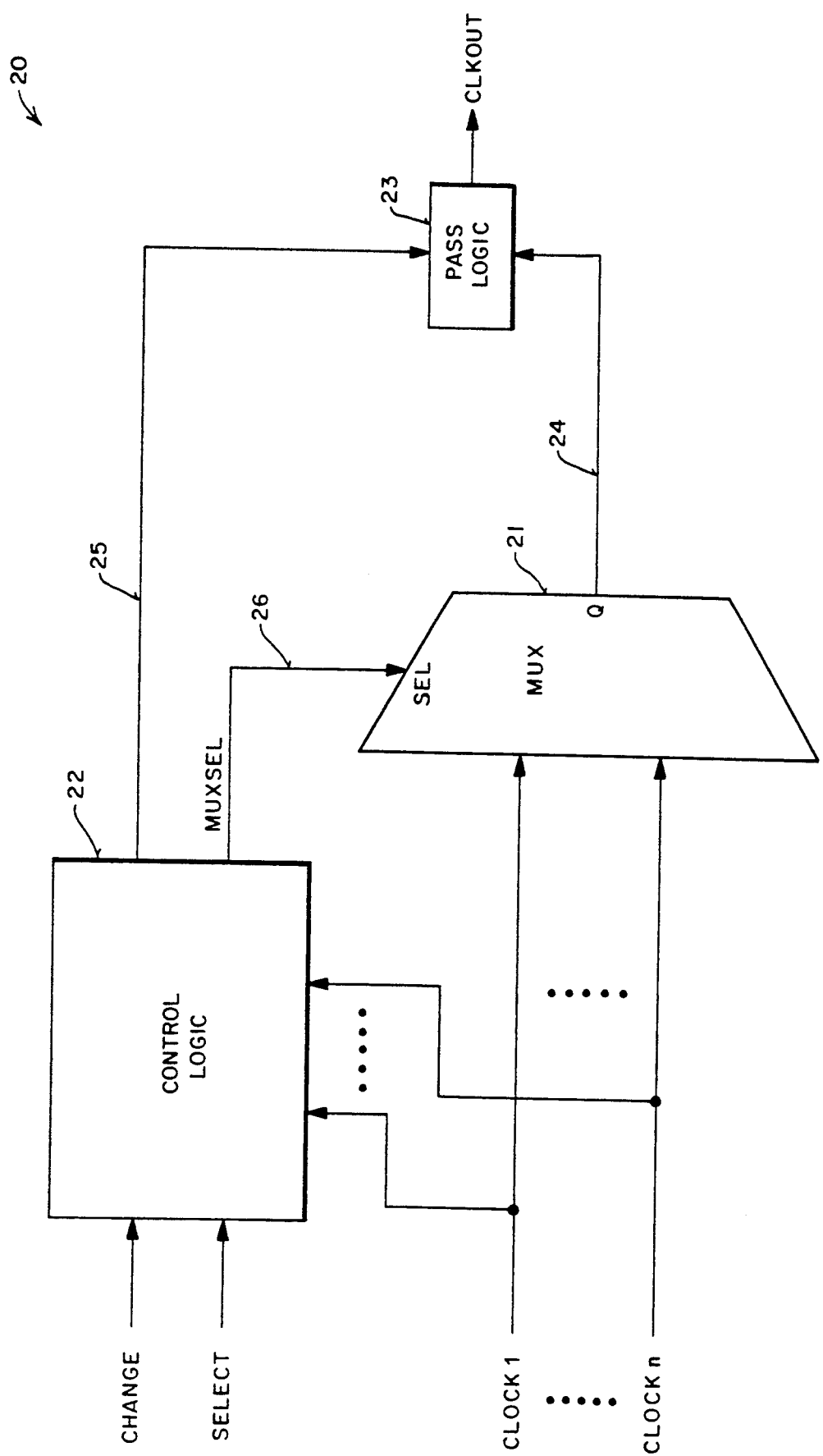
FIG. 3 is a block diagram of the clock switching circuit of FIG. 2.

FIG. 3 illustrates in block diagram form the circuitry of clock switching circuit 20 of FIG. 1. In FIG. 3, clock switching circuit 20 includes a multiplexer 21, a control logic 22, and a pass logic 23.

Multiplexer 21 receives a number of clock signal CLOCK1 through CLOCKn. Multiplexer 21 selectively applies a selected one of clock signals CLOCK1-CLOCKn to pass logic 23 via its output Q. The selection of multiplexer 21 is controlled by a select signal MUXSEL. The select signal MUXSEL is applied to the select input SEL of multiplexer 21 from control logic 22 via line 26.

Control logic 22 is also coupled to the clock signal CLOCK1-CLOCKn. The operation of control logic 22 is clocked by the selected one of the clock signals CLOCK1-CLOCKn. Control logic 22 includes a multiplexer (not shown) to select the selected one of the clock signals CLOCK1-CLOCKn. The multiplexer of control logic 22 is controlled by a select signal SELECT to select the selected one of clock signals CLOCK1-CLOCKn. Control logic 22 receives a switching signal CHANGE and provides its control output to pass logic 23 via line 25. Control logic 22 generates the MUXSEL signal to multiplexer 21 to select the selected one of the clock signals CLOCK1-CLOCKn. Before generating the MUXSEL signal, control logic 22 blocks the output of pass logic 23 to output any clock signal Controlled by the control output of control logic 22, pass logic 23 passes the selected one of the clock signal CLOCK1-CLOCKn from multiplexer 21 to become the system clock CLKOUT when multiplexer 21 completes its selection.

The clock signals CLOCK1-CLOCKn represent the clock signals adopted by various components 12-17 in computer system 10 of FIG. 2. For instance, the clock signal CLOCK1 may be the clock signal of CPU 12 and the clock signal CLOCKn may be the clock signal of disk driver 16. The clock signals CLOCK1-CLOCKn are applied to clock switching circuit 20 from each of components 12-17 via bus 11 of FIG. 2. As described above, each of component 12-17 in FIG. 2 operates under the control of its own clock signal, independent of the clock signals of other components in computer system 10. When two of components 12-17 of computer system 10 in FIG. 2 are exchanging data, the two components are synchronized to the system clock signal CLKOUT of clock switching circuit 20 for the data transfer.

Clock switching circuit 20 minimizes the transitional period required to effect the switching between two clock signals. Clock switching circuit 20 also assures the transition between two clock signals is glitch-free. This is accomplished by controlling the transitional period of the switching operation in alignment with the clock edges of the two clock signals. In addition, the switching operation is also controlled to be synchronized to the selected clock signal. When the CHANGE signal is received, control logic 22 controls pass logic 23 to stop outputting the current clock signal by forcing pass logic 23 to a logical high state. When this occurs, the current output state is maintained at logical high, thus preventing any glitches. Meanwhile, control logic 22 receives the SELECT signal to select the selected clock signal to synchronize the device operation of control logic 22. Control logic 22 then generates the MUXSEL signal to multiplexer 21 to select the selected clock signal from the clock signals CLOCK1-CLOCKn. When the multiplexer switching operation of multiplexer 21 is complete, control logic 22 allows pass logic 23 to couple the output signal of multiplexer 21 which is the selected clock signal out. The logical high hold-up up state is then released during the logical high state of the selected clock signal.

Figure 4:
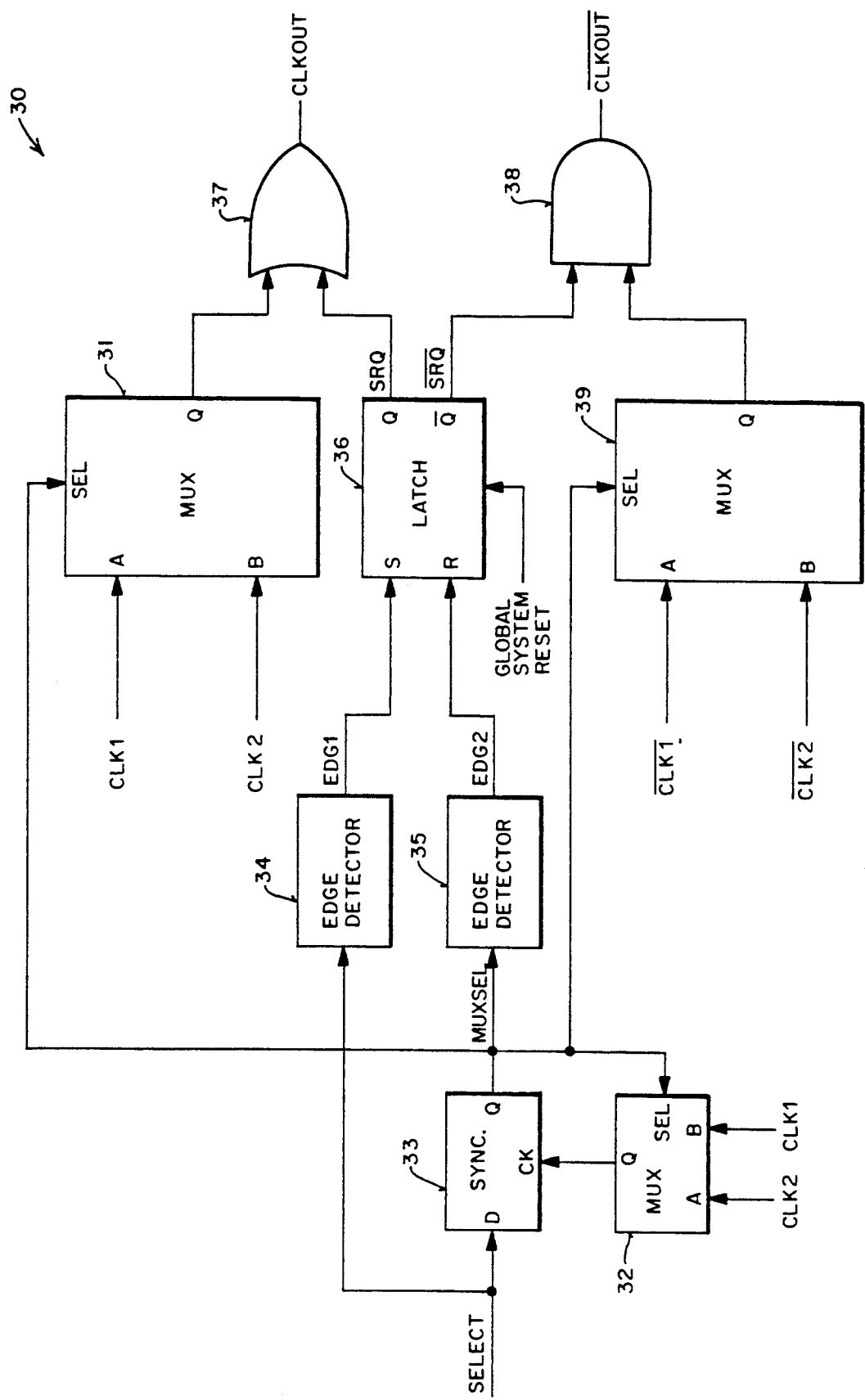
FIG. 4 a circuit diagram showing one embodiment of the clock switching circuit of FIG. 3.

FIG. 4 illustrates a circuit block diagram of one embodiment of clock switching circuit 20. In FIG. 4, a clock switching circuit 30 is shown to switch between two clock signals. Clock switching circuit 30 receives a first clock signal CLK1 and a second clock signal CLK2. The first and second clock signals CLK1 and CLK2 are applied from the components 12-17 in computer system 10 of FIG. 2. Clock switching circuit 30 includes an output signal CLKOUT. The output signal CLKOUT is applied to computer system 10 of FIG. 2 as the system clock for the data transfer operation. Clock switching circuit 30 of FIG. 4 includes three multiplexers 31, 32, and 39. Multiplexer 31 receives the first clock signal CLK1 at its A input and the second clock signal CLK2 at its B input. Multiplexer 31 switches between the first and second clock signals CLK1 and CLK2 under the control of a switching signal MUXSEL at its select input SEL. Multiplexer 31 then applies its output signal to an OR gate 37 from its Q output.

Multiplexer 39 receives the inverted first clock signal $\overline{CLK1}$ at one input (e.g., input "A") and the inverted second clock signal $\overline{CLK2}$ at its other input (e.g., input "B"). Multiplexer 39 receives the switching signal MUXSEL at its select input SEL. Multiplexer 39 switches between the $\overline{CLK1}$ signal and the $\overline{CLK2}$ signal to its output Q under the control of the MUXSEL signal. The output Q of multiplexer 39 is applied to an AND gate 38. AND gate 38 outputs a $\overline{\text{CLKOUT}}$ signal which is the inverted signal of the CLKOUT signal.

Multiplexer 32 receives the first clock signal CLK1 and the second clock signal CLK2. However, multiplexer 32 receives the first clock signal CLK1 at its B input and the second clock signal CLK2 at its A input. Multiplexer 32 is also controlled by the MUXSEL signal to selectively output the first clock signal CLK1 or the second clock signal CLK2 at its Q output.

Given that multiplexers 31 and 32 are all controlled by the MUXSEL signal, when multiplexer 31 is controlled to select the first clock signal CLK1 at its A input to its output, multiplexer 32 is controlled to select the second clock signal CLK2 at its A input to its output. When multiplexer 31 is controlled to select the second clock signal CLK2 at its B input, multiplexer 32 is controlled to select the first clock signal CLK1 at its B input.

Clock switching circuit 30 further includes a synchronizer ("SYNC") 33. In the presently preferred embodiment, synchronizer 33 is a two stage synchronizer. Synchronizer 33 receives a switching signal SELECT at its D input. Synchronizer 33 is coupled to receive the output clock signal from multiplexer 32. Synchronizer 33 then synchronizes the switching signal SELECT with the output clock received from multiplexer 32. Synchronizer 33 outputs the MUXSEL signal at its Q output. The MUXSEL signal is the synchronized switching signal of the SELECT signal. As described above, the MUXSEL signal is coupled to multiplexers 31, 32, and 39 to switch the output of these multiplexers between their A input and B input. For example, if multiplexers 31, 32, and 39 have been switched by a previous MUXSEL signal to output the input signal at their A inputs, the current MUXSEL signal will switch the output signals of multiplexers 31, 32, and 39 from the A inputs to their B inputs. When the next MUXSEL signal is received, multiplexers 31, 32, and 39 then switch their output signal from their B inputs to their A inputs.

The SELECT signal is also applied to an edge detector 34. Edge detector 34 detects the signal edges of the SELECT signal. In one preferred embodiment, edge detector 34 detects the rising and falling edges of the SELECT signal. In alternative embodiments, edge detector 34 detects the rising edges or the falling edges of the SELECT signal.

Edge detector 34 is coupled to a set input S of a set-rest latch 36. When edge detector 34 detects the edge of the SELECT signal, it outputs a pulse signal EDG 1 to the S input of latch 36. Latch 36 then is triggered to output a logical high SRQ signal at its Q output to OR gate 37. The $\overline{\text{Q}}$ output of latch 36 outputs a logical low $\overline{\text{SRQ}}$ signal to AND gate 38. OR gate 37 is thus forced to output a high CLKOUT signal, regardless of the input signal from multiplexer 31. AND gate 38 is also forced to output a logical low $\overline{\text{CLKOUT}}$ signal which is the inverted signal of the CLKOUT signal, regardless of its input signal from multiplexer 39.

Latch 36 also includes a reset input RESET. RESET input of latch 36 receives a global system reset signal at every power up. This signal ensures that the output clock signal CLKOUT switches from one of the CLK1 and CLK2 signals to the other at every power up of computer system 10.

Because of the synchronizing delay in synchronizer 33, the MUXSEL signal is not generated from synchronizer 33 to apply to multiplexers 31 and 39 when both OR gate 37 and AND gate 38 are blocked by their respective signals SRQ and $\overline{\text{SRQ}}$. This synchronizing delay ensures that any glitch caused by the switching operating of multiplexers 31 and 39 will not be passed to the output signals CLKOUT and $\overline{\text{CLKOUT}}$. The output signal EDG1 of edge detector 34 indicates the beginning of a transitional period in which the glitch-free switching between the clock signals CLK1 and CLK2 is obtained. As described above the transitional period is minimum.

The MUXSEL signal is generated from the SELECT signal after the synchronizing delay in synchronizer 33. When the MUXSEL signal is generated, it is applied to the SEL inputs of multiplexers 31, 32, and 39 and each of multiplexers 31, 32, and 39 starts the switching operation under the control of the MUXSEL signal. Meanwhile, the MUXSEL signal is also applied to edge detector 35 to detect the edge of the MUXSEL signal. Edge detector 35 is coupled a reset input R of latch 36. When edge detector 35 detects the edge of the MUXSEL signal, it outputs an EDG2 signal to the reset input R of latch 36. The EDG2 signal at the rest input R of latch 36 causes latch 36 to bring its output signal SRQ at the Q output to logical low and the output signal $\overline{\text{SRQ}}$ at the $\overline{\text{Q}}$ output to logical high. The logical low SRQ signal releases OR gate 37 and the logical high $\overline{\text{SRQ}}$ signal releases AND gate 38, thus ending the transitional period for the switching operation. Because the MUXSEL signal is applied to multiplexers 31 and 39 at the same time the signal is applied to edge detector 35, the switching operation is completed when the logical low SRQ signal and the logical high $\overline{\text{SRQ}}$ signal release OR gate 37 and AND gate 38, respectively. In this way, the glitch-free switch between the clock signals CLK1 and CLK2 is accomplished. Also, the transitional period is maintained to be minimum.

The operation of clock switching circuit 30 to switch its output signal CLKOUT (i.e., the system clock) between the first clock CLK1 and the second clock CLK2 is described in more detail below, in conjunction with FIGS. 6–9.

Figure 6:
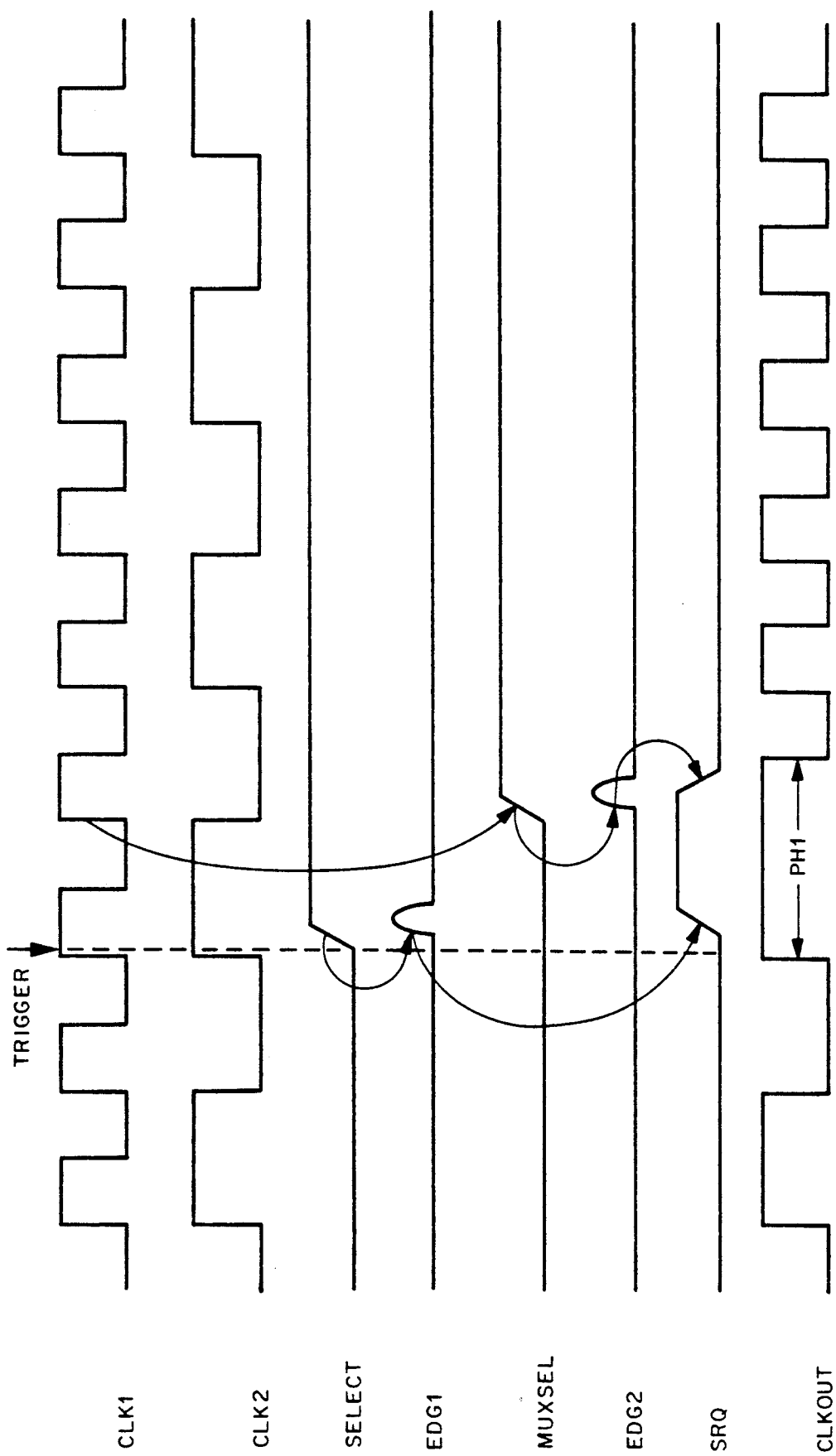
FIGS. 6-9 are timing diagrams of the clock switching circuit of FIG. 4, showing the switching operation between two clocks.

FIG. 6 illustrates the signal waveforms of clock switching circuit 30 of FIG. 4 in connection with the first and second clock signals CLK1 and CLK2. FIG. 6 illustrates the situation in which clock switching circuit 30 switches its output signal from the second clock signal CLK2 to the first clock signal CLK1.

Figure 7:
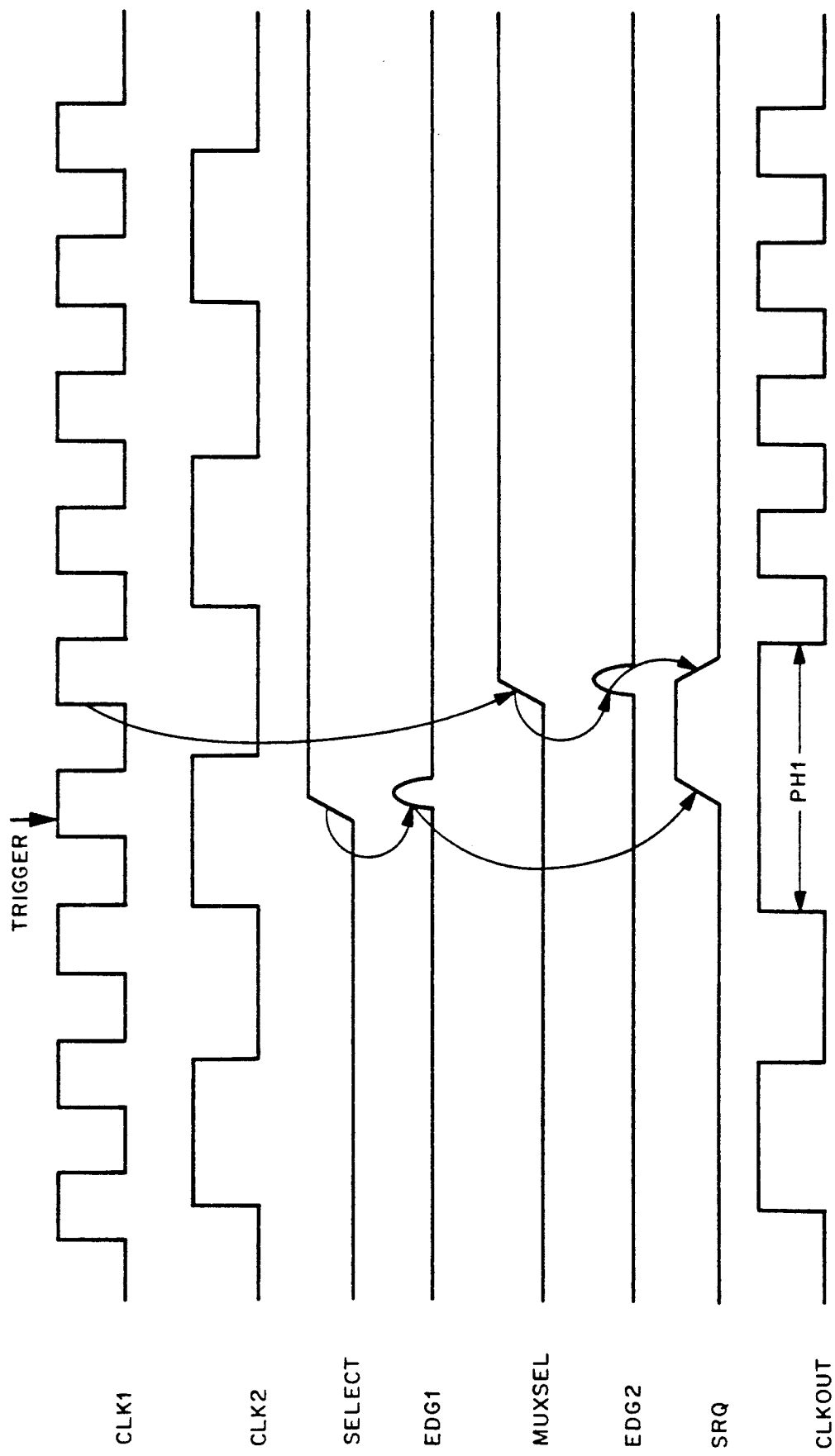
Figure 9:
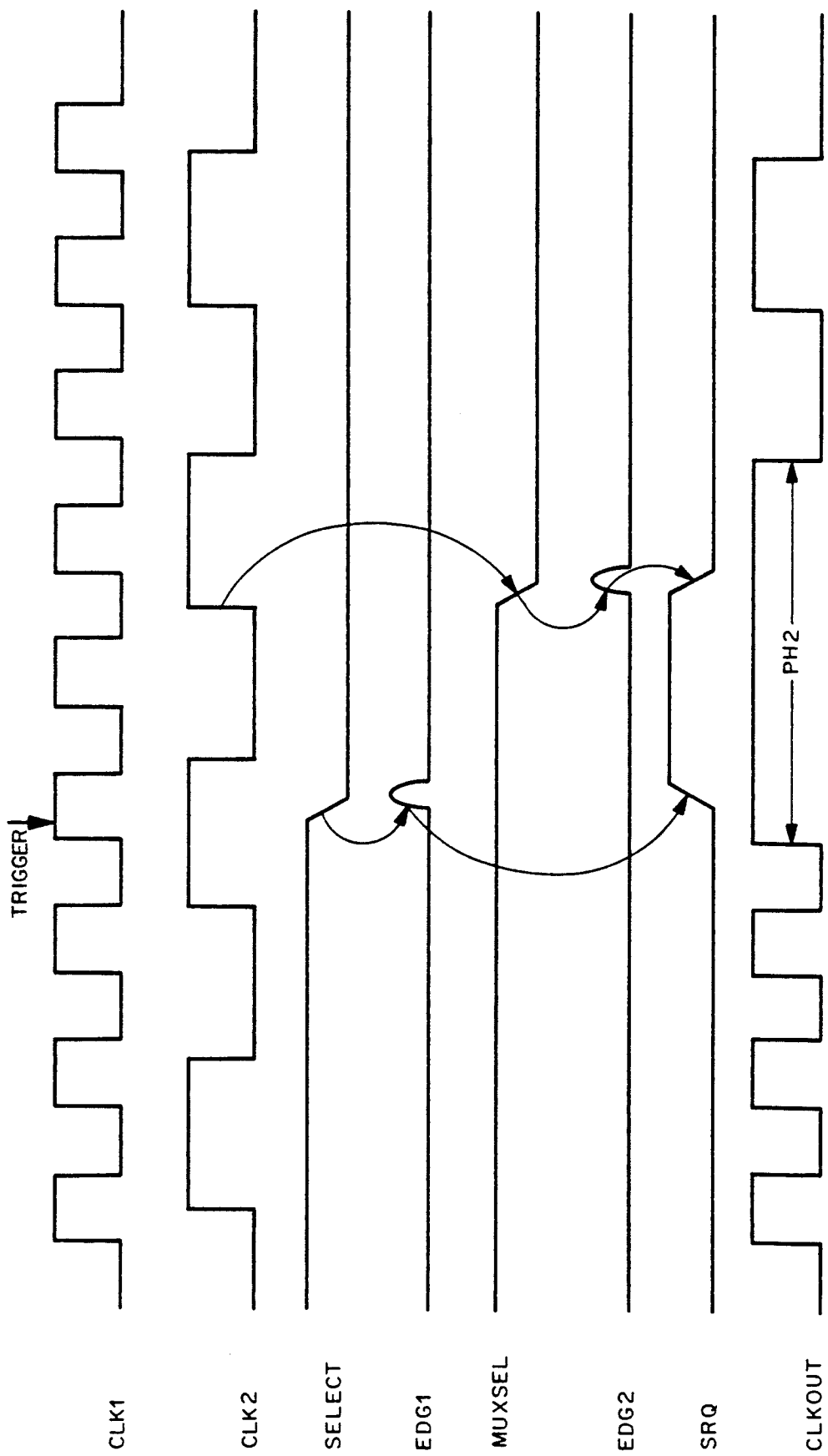

As can been seen from FIG. 6, clock signals CLK1 and CLK2 are synchronized to each other for the convenience of description. However, it shall be noted that clock signals CLK1 and CLK2 are not required to be synchronized to each other. For example, the frequency of the first clock signal CLK1 can be 25 MHz while the frequency of the second clock signal CLK2 can be 8.33 MHz. FIGS. 7 and 9 illustrate the situation in which clock signals CLK1 and CLK2 are not synchronized to each other, which will be described in more detail below.

In FIG. 6, the output signal CLKOUT of clock switching circuit 30 is the second clock signal CLK2 before a high switching signal SELECT is received at synchronizer 33 of FIG. 4. Therefore, as can be seen from FIG. 4, multiplexer 31 is controlled by the previous MUXSEL signal to couple its B input to its output Q. Meanwhile, multiplexer 32 is controlled by the previous MUXSEL signal to couple the first clock signal CLK1 which is applied at its B input to synchronizer 33. In other words, the previous MUXSEL signal controls multiplexers 31, 32, and 33 to switch their respective outputs from their A inputs to their B inputs.

When the logical high switching signal SELECT is received, edge detector 34 detects the rising edge of the SELECT signal and generates a pulse signal EDG1 to the set input of latch 36. Latch 36 is then caused to output a logical high SRQ signal at its Q output.

Meanwhile, the switching signal SELECT is applied to synchronizer 33 of FIG. 4. As can be seen from FIG. 4, synchronizer 33 is clocked by the first clock signal CLK1 coupled to the B input of multiplexer 32. Therefore, synchronizer 33 synchronizes the select signal SELECT to the first clock signal CLK1. As can be seen from FIG. 6, synchronizer 33 outputs the logical high MUXSEL signal at the rising edge of the first clock signal CLK1. As described above, the MUXSEL signal is the SELECT signal which has been synchronized to the first clock signal CLK1.

The logical high MUXSEL signal is then coupled to the select input SEL of multiplexer 31 which switches the output of multiplexer 31 from the second clock signal CLK2 which is applied at the B input of multiplexer 31 to the first clock signal CLK1 at the A input. Multiplexer 31 then couples the first clock signal to OR gate 37 (FIG. 4).

At this time, OR gate 37 is still forced to output a high state signal by the high SRQ signal at its another input. Therefore, the output signal CLKOUT is maintained high during the period of switching multiplexer 31 from its B input to its A input. In this way, any glitch in the output signal of multiplexer 31 caused by the switching is blocked from being coupled to become the CLKOUT output signal, thus ensuring a glitch-free switching by clock switching circuit 30 (FIG. 6).

The synchronized select signal MUXSEL is also applied to edge detector 35. Edge detector 35 detects the edge of the MUXSEL signal and generate a pulse signal EDG2 to the reset input of latch 36, as is seen from FIG. 6. Latch 36 is then caused to output a low SRQ signal, thus ending the transitional period of switching (FIG. 6). As can be seen from FIG. 6, the transitional period PH1 of the CLKOUT signal is longer than the pulse period of the second clock signal CLK2 such that logic operations under the second clock signal CLK2 can be completed during the switching.

By using two stage synchronizer 33, which is clocked by the selected first clock signal CLK1, the transitional period PH1 is equal to a three clock pulse period of the selected clock signal CLK1 as the first clock signal CLK1 is synchronous to the second clock signal CLK2. This ensures a minimum transitional period PH1 with glitch-free switching.

FIG. 7 also illustrates the signal waveforms of clock switching circuit 30 of FIG. 4 in connection with the first and second clock signals CLK1 and CLK2. FIG. 7 illustrates the switching operation of clock switching circuit 30 from the second clock signal CLK2 to the first clock signal CLK1, wherein the first clock signal CLK1 is asynchronous to the second clock signal CLK2. As can be seen from FIG. 7, the switching operation of clock switching circuit 30 of FIG. 4 remains the same as the switching operation of circuit 30 from the second clock signal CLK2 to the first clock signal CLK1 shown in FIG. 6.

As also can be seen from FIG. 7, the transitional period PH1 is greater than the pulse period of the second clock signal in which logic operations in computer system 10 (FIG. 2) under the second clock signal CLK2 can be completed.

Figure 8:
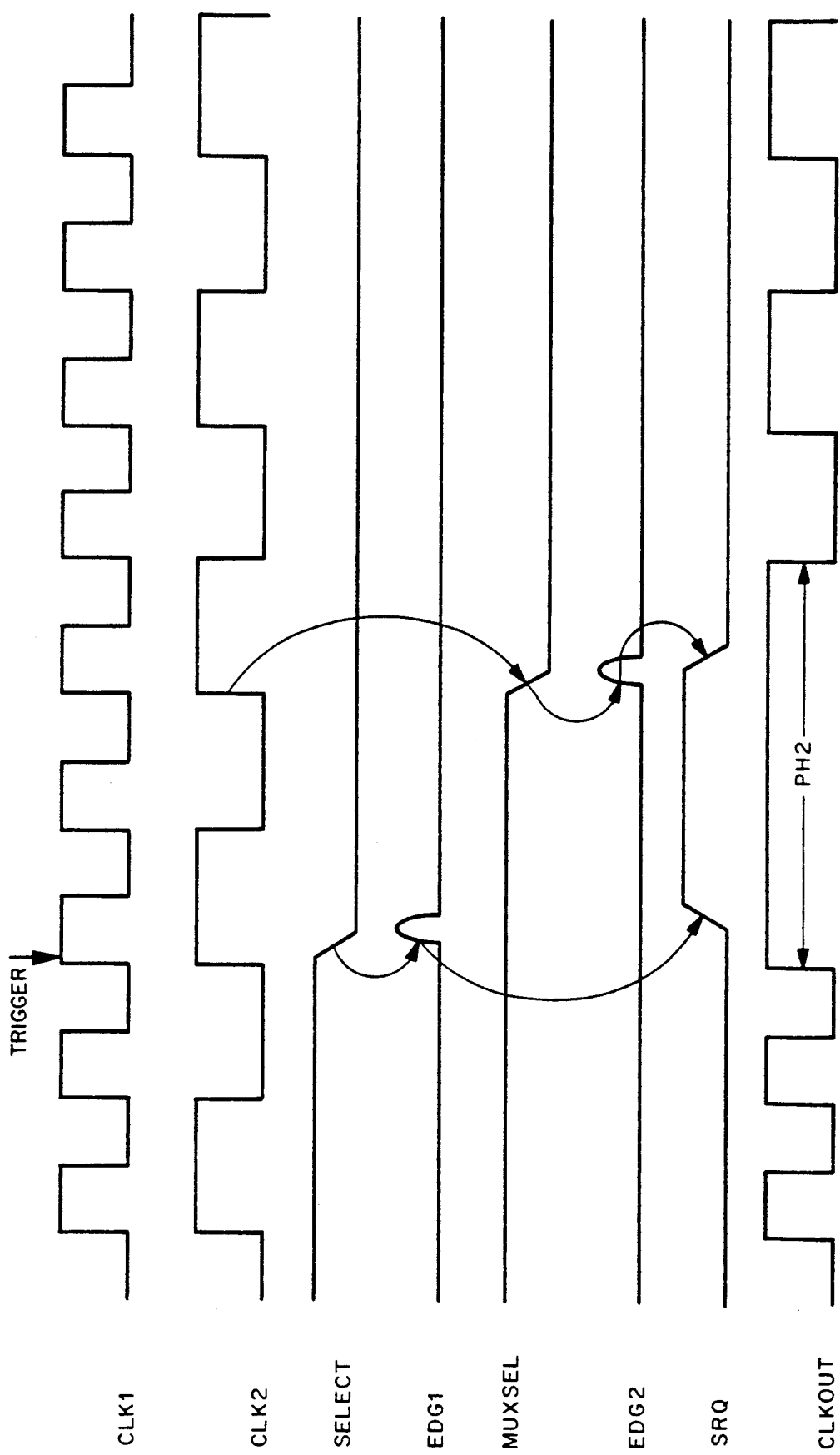

FIGS. 8 and 9 illustrate the signal waveforms of clock switching circuit 30 of FIG. 4 in connection with the first clock signal CLK1 and the second clock signal CLK2. FIGS. 8 and 9 illustrate the situation in which switching circuit 30 (FIG. 4) switches the output system clock signal CLKOUT from the first clock signal CLK1 to the second clock signal CLK2. FIG. 8 shows the situation where the first clock signal CLK1 is synchronous to the second clock signal CLK2. FIG. 9 shows the situation where the first clock signal CLK1 is asynchronous to the second clock signal CLK2.

As can be seen from FIGS. 8 and 9, the switching operation of clock switching circuit 30 of FIG. 4 from the first clock signal CLK1 to the second clock signal CLK2 is the same as the switching operations shown in FIGS. 6 and 7.

Figure 5:
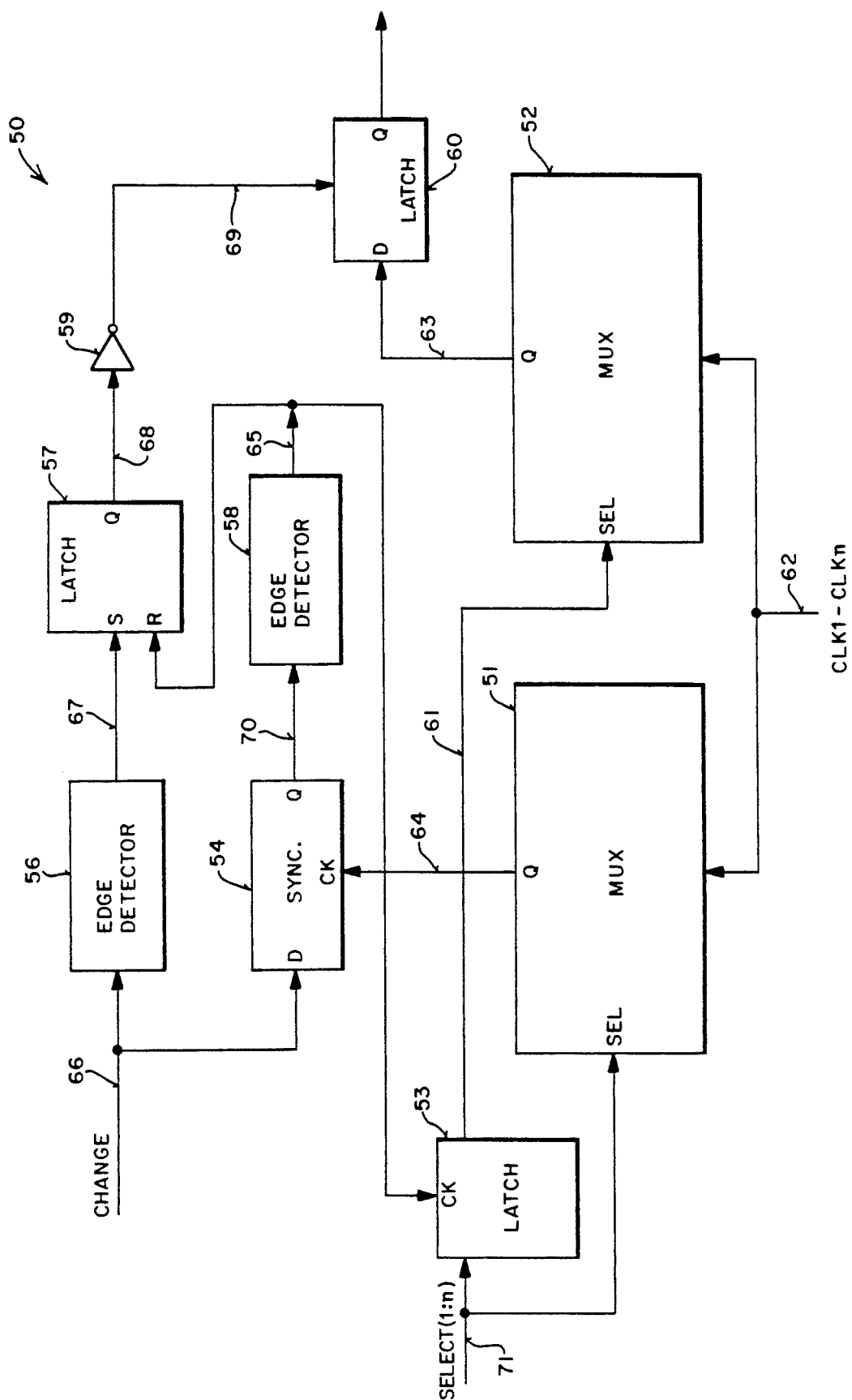
FIG. 5 is a circuit diagram showing another embodiment of the clock switching circuit of FIG. 3.

Referring to FIG. 5, an alternative embodiment of clock switching circuit 20 of FIG. 3 is shown. In FIG. 5, a clock switching circuit 50 is shown to switch between a plurality of clock signals CLK1 through CLKn. Clock switching circuit 50 receives a select signal SELECT and a change signal CHANGE. The select signal SELECT controls clock switching circuit 50 to select one of the clock signals CLK1-CLKn to its output. The change signal CHANGE controls switching circuit 50 to switch and output the selected one of the clock signals CLK1-CLKn.

As can be seen from FIG. 5, clock switch circuit 50 includes multiplexers 51 and 52, latches 53, 57, and 60, synchronizer 54, edge detectors 56 and 58, and inverter 59.

The clock signals CLK1-CLKn are applied to multiplexers 51 and 51 via bus 62. Before the switching operation, one of the clock signal CLK1-CLKn has been selected by a previous switching operation to be coupled to latch 60 from multiplexer 52 and to synchronizer 54 from multiplexer 51. Latch 60 then passes the selected one of the clock signal CLK1-CLKn out to become the output clock signal CLKOUT. The CLKOUT clock signal is then applied to computer system 10 of FIG. 2.

The switching operation starts when the selected signal SELECT is received. In one embodiment, the SELECT signal includes a number of bits, each corresponding to one of the clock signals CLK1-CLKn. When the SELECT signal is received, switching circuit 50 applies the signal to multiplexer 51 at the select input SEL and to latch 53. Latch 53 includes a plurality of individual latches and is clocked by the output signal of edge detector 58.

Controlled by the SELECT signal, multiplexer 51 selects one of the clock signals CLK-CLKn and applies the selected clock signal to a clock input of synchronizer 54. For example, if the SELECT signal intends to select the CLKn clock signal, the CLKn clock signal is coupled to the clock input of synchronizer 54 from multiplexer 51 when multiplexer 51 receives the SELECT signal. At this time, the output signal of multiplexer 52 remains unchanged because the SELECT signal is not directly applied to multiplexer 52. Multiplexer 52 receives the SELECT signal via line 61 and via latch 53. As can be seen from FIG. 5, latch 53 is clocked by the signal applied at its clock input CK from edge detector 58 via line 65 to output the SELECT signal to multiplexer 52. Therefore, the timing of the clock selection of multiplexer 52 is controlled by the signal from edge detector 58.

Meanwhile, the CHANGE signal is coupled to edge detector 56 and synchronizer 54, respectively. Edge detector 56 is coupled to the set input of latch 57. When edge detector 56 detects the CHANGE signal, it causes latch 57 to output a HOLD signal which is coupled to latch 60 via inverter 59. The HOLD signal then causes latch 60 which is the output latch of switching circuit 50 to stop outputting the current clock signal by forcing the output of latch 60 to high. At this time, synchronizer 54 synchronizes the CHANGE signal to the selected clock signal from multiplexer 51 and applies the synchronized CHANGE signal to edge detector 58. Edge detector 58 detects the synchronized CHANGE signal and outputs a pulse signal to the clock input of latch 53 and the reset R input of latch 57. Controlled by the pulse signal from edge detector 58, latch 53 applies the SELECT signal to multiplexer 52 to select the selected clock signal from the clock signal CLK1-CLKn.

Controlled by the pulse signal at its R input, latch 57 then causes to output the HOLD signal to latch 60 via inverter 59. Latch 60 then passes the selected clock signal out to become the CLKOUT signal.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A clock switching apparatus in a data processing system which includes a system clock for selectively switching the system clock from a first clock signal to a second clock signal, comprising:
   multiplexing means coupled to receive the first clock signal and the second clock signal for selectively switching the system clock from the first clock signal to the second clock signal, wherein the multiplexing means provides the system clock;
   synchronizing means coupled to receive a switching signal having a signal edge and the second clock signal for synchronizing the switching signal with the second clock signal such that the switching signal becomes a synchronized switching signal, wherein the synchronized switching signal causes the multiplexing means to switch the system clock from the first clock signal to the second clock signal;
   pass logic means coupled to receive the system clock from the multiplexing means for outputting the system clock to the data processing system;
   first edge detecting means coupled to receive the switching signal for detecting the signal edge of the switching signal;
   second edge detecting means coupled to receive the synchronized switching signal from the synchronizing means for detecting the signal edge of the synchronized switching signal; and
   latching means coupled to the first and second edge detecting means for forcing the pass logic means to output a high state signal during a transitional period, wherein the transitional period starts when the first edge detecting means detects the signal edge of the switching signal and ends after the second edge detecting means detects the signal edge of the synchronized switching signal, wherein the multiplexing means switches the system clock from the first clock signal to the second clock signal within the transitional period, wherein the transitional period is glitch-free and minimum.

2. The clock switching apparatus of claim 1, wherein the signal edge is a rising edge.

3. The clock switching apparatus of claim 1, wherein the synchronizing means is switched to receive the first clock signal when the multiplexing means switches the system clock from the first clock signal to the second clock signal.

4. The clock switching apparatus of claim 1, wherein the latching means is a set-reset latch.

5. The clock switching apparatus of claim 1, wherein the pass logic is an OR gate.

6. A clock switching apparatus in a data processing system having a system clock and a plurality of clock signals for switching the system clock from a first clock signal to a second clock signal, wherein the first clock signal and the second clock signal are included in the plurality of clock signals, wherein the clock switching apparatus comprising:
   first multiplexing means coupled to receive the plurality of clock signals for selectively providing the system clock from the plurality of clock signals, wherein the system clock is the first clock signal;
   pass logic means coupled to receive the system clock from the first multiplexing means for outputting the system clock to the data processing system;
   second multiplexing means coupled to receive the plurality of clock signals and a select signal for selectively providing the second clock signal under the control of the select signal, wherein the select signal indicates to select the second clock signal from the plurality of clock signals;
   synchronizing means coupled to receive a switching signal having a signal edge and the second clock signal for synchronizing the switching signal with the second clock signal such that the switching signal becomes a synchronized switching signal;
   first latching means coupled to receive the select signal and the synchronizing switching signal for applying the select signal to the first multiplexing means to switch the system clock from the first clock signal to the second clock signal, wherein the synchronized switching signal causes the first latching means to apply the select signal to the first multiplexing means;
   first edge detecting means coupled to receive the switching signal for detecting the signal edge of the switching signal;
   second edge detecting means coupled to receive the synchronized switching signal from the synchronizing means for detecting the signal edge of the synchronized switching signal; and
   second latching means coupled to the first and second edge detecting means for forcing the pass logic means to output a high state signal during a transitional period, wherein the transitional period starts when the first edge detecting means detects the signal edge of the switchig signal and ends after the second edge detecting means detects the signal edge of the synchronized switching signal, wherein the first multiplexing means switches the system clock from the first clock signal to the second clock signal within the transitional period, wherein the transitional period is glitch-free and minimum.

7. The clock switching apparatus of claim 6, wherein the pass logic means is a latch.

8. The clock switching apparatus of claim 6, wherein the second latching means is a set-reset latch.

9. The clock switching apparatus of claim 6, wherein the plurality of clock signals are asynchronous to each other.

10. A method of selectively switching a system clock from a first clock signal to a second clock signal in a data processing system having the system clock and a plurality of clock signals, wherein the plurality of clock signals include the first clock signal and the second clock signal, the method comprising the steps of:

(A) applying a switching signal to a synchronizing means;

(B) synchronizing the switching signal in a synchronizing means to the second clock signal to become a synchronized switching signal, wherein the synchronizing means is clocked by the second clock signal;

(C) applying the synchronized switching signal to a multiplexing means to switch the system clock from the first clock signal to the second clock signal, wherein the multiplexing means is coupled to receive the plurality of clock signals, wherein the multiplexing means provides the system clock;

(D) applying the system clock to a pass logic means from the multiplexing means, wherein the pass logic means controls passage of the system clock to the data processing system;

(E) applying the switching signal to a first edge detecting means for detecting a signal edge of the switching signal, wherein the signal edge represents a request for switching the system clock;

(F) applying the synchronized switching signal to a second edge detecting means for detecting the signal edge of the synchronized switching signal; and (G) controlling the pass logic means to output a high state signal during a transitional period, wherein the transitional period starts when the first edge detecting means detects the signal edge of the switching signal and ends after the second edge detecting means detects the signal edge of the synchronized switching signal, wherein the multiplexing means switches the system clock from the first clock signal to the second clock signal with the transitional period, wherein the transitional period is glitch-free and minimum.

11. The method of claim 10, wherein the step (B) further comprises the step of selecting the second clock signal from the plurality of clock signals and applying the second clock signal to the synchronizing means.

* * * * *